March 23, 1948.  W. PATROSIO ET AL  2,438,479
DUST-PROOF LEVELING SCREW
Filed Dec. 21, 1944
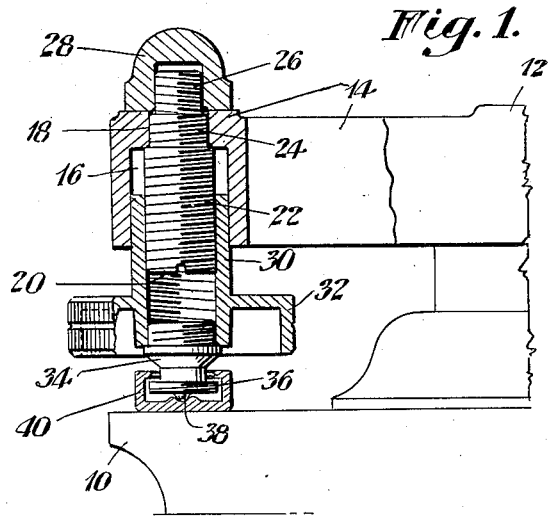
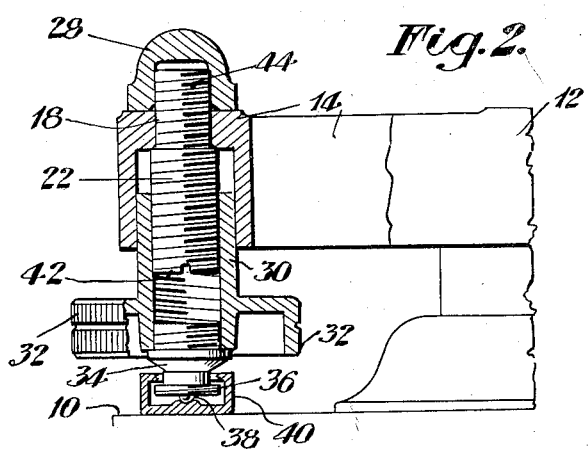
INVENTORS
WILLIAM PATROSIO
WILLIAM FERBER
BY Pennie, Davis, Marvin & Edmonds
ATTORNEYS Patented Mar. 23, 1948

2,438,479

UNITED STATES PATENT OFFICE 2,438,479

DUSTPROOF LEVELING SCREW

William Patrosio, Jersey City, and William Ferber, Hoboken, N. J., assignors to Keuffel & Esser Company, Hoboken, N. J., a corporation of New Jersey Application December 21, 1944, Serial No. 569,146

4 Claims. (Cl. 248—180)

This invention relates to improvements in leveling screws for transits, levels and other instruments in which adjustable leveling means are employed for making the instrument level. More particularly, the invention relates to an improved dust-proof leveling screw construction for use on transits and similar instruments which are used outdoors, and therefore come in contact with sand, dust, water and other materials.

Surveying instruments are usually provided with three or four leveling screws which are threaded directly through the ends of the arms of the leveling head. In such constructions, the threads are subjected to contact with sand, dust, rain and other materials under normal conditions of use. Since the leveling screws are in constant use, the threads therefore become worn excessively and result in considerable play which is undesirable in a surveying instrument because it may lead to inconsistent and inaccurate results. Attempts have been made to provide means for keeping the dust and dirt from the threads of adjusting screws, but so far as known such means have merely been more or less temporary structures associated with the usual screw which operates directly in the leveling arm by a threaded connection, and are therefore not entirely astisfactory.

The primary object, therefore, of the present invention is to provide improved dust proof leveling screw of durable construction.

A further object of the invention is to provide a dust-proof leveling screw construction which is easy to manufacture, assemble and operate.

According to the features of the present invention, the improved dust-proof leveling screw construction comprises a threaded stud mounted in the outer portion of a leveling arm in spaced relation to the inside of a surrounding chamber or weather hood in the arm, the stud being secured in the upper portion of the arm, extending through the chamber and projecting below the arm, a threaded sleeve engaging said screw and extending from below into said chamber in sliding engagement with the walls thereof, a bearing on the lower portion of said sleeve engaging the leveling base or plate such as a tripod plate, and means for rotating said sleeve to operate the leveling arm.

The preferred form of the invention includes other features such as a provision of a threaded stud provided with a threaded section for attaching it to the upper portion of the leveling arm, and another threaded section extending above the arm for attaching a lock nut cap.

An important feature of the invention is the provision of a right-handed thread for engagement of the stud and sleeve, a right-handed thread for engagement of the stud with the arm, and a left-handed thread for securing the locking cap to the stud and top of the arm.

Other features, objects and advantages of the improved construction of the present invention will be apparent to those skilled in the art from the following more detailed description thereof, taken in connection with the accompanying drawings which form part of this application.

In the drawings:

Fig. 1 is a vertical sectional view of a preferred form of an improved leveling screw arrangement of the present invention, shown in connection with a portion of a surveying instrument.

Fig. 2 is a view similar to that of Fig. 1 showing a modified form of construction.

In the drawings, the improved leveling screw is illustrated in connection with a leveling arm of a surveying instrument, and it is to be understood that the improved leveling screw construction of the present invention may be used in various types of apparatus such as levels, transits and other instruments in which one or more leveling screws are used. In Fig. 1 the apparatus as shown includes, for example, a tripod plate 10, which is usually mounted on the head of a tripod, leveling head 12 which customarily supports the "center" or spindle of the instrument. The leveling head is usually a cast member which includes three or four integral leveling arms 14 which extend substantially parallel to and above the tripod plate 10. The arms 14 usually consist of two metal bars extending out to the mounting for the leveling screws. In the present construction the outer ends of the leveling arms 14 are provided with a vertically arranged cylindrical bore or chamber 16 which preferably has an accurately machined and polished side wall. The bore 16 extends from the lower portion of the arm up to a substantially smaller concentric threaded bore 18, thereby providing a hood to shed dust and rain.

An important feature of the present invention is the provision of an adjusting screw stud 20 which is provided with three sets of threads 22, 24 and 26 of progressively smaller diameter. The long thread 22 is a right-handed thread and is the adjusting thread of the leveling screw construction. The thread 24 is also a right-handed thread for engaging the threaded aperture 18, while the thread 26 is a left-handed thread for receiving a locking cap 28 which covers the top of the stud 20 and locks it in place concentrically in the bore 16. The cap 28 engages and fits the top of the locking arm 14. The stud 20 and thread 22 is of sufficient length to provide ample adjusting height for leveling the arm 14. A screw-driver slot is provided in the lower end of the stud. The adjusting screw construction also includes an internally threaded sleeve member 30 which is threaded to fit the thread 22 of stud 20 and which is machined and polished externally to substantially fit the bore 16. The sleeve member 30 is provided with a hand wheel 32, and with a shouldered shoe stud 34 which is threaded and screwed into its lower portion, as shown. The member 34 is tapered to a lower section of smaller diameter which is provided with a threaded flange 36 and a tip 38. The lower portion of the member 34 is covered by a leveling screw shoe 40 which fits loosely on the member 34. The shoe 40 has a flat bottom which rests on the tripod plate 10 and a socket for receiving the pivot tip 38. The shoe 40 has a small internal thread at the top which engages the thread 36 when the shoe is put on the member 34, but the shoe 40 is made so that its thread disengages and overlies the thread 36 and provides a loose or socket joint connection. The threads on the members 34 and 40 prevent the accidental removal or loss of the shoe 40.

In the construction shown in Fig. 1, the screw stud 20 is mounted in a fixed position in the end of the arm 14 with the shoulder between the threads 22 and 24 engaging the shoulder at the upper end of the bore 16. The left-handed thread 26 locks the stud 20 in a fixed position so that it is not moved in the arm 14 when the hand wheel 32 is operated to effect a leveling operation. It will be noted that the improved leveling screw construction shown in Fig. 1 is entirely dust-proof and that since the polished outside of the sleeve 30 fits closely adjacent the polished bore 16, it is practically impossible for dust, grease and other foreign materials to come in contact with the thread 22 and the internal thread of the closed sleeve 30.

The modified form of the leveling screw construction shown in Fig. 2 includes all of the elements shown in Fig. 1 but differs therefrom by including a modified form of screw stud 42 having a single right-handed thread 44 in place of the right-handed thread 24 and the left-handed thread 26, for securing the stud 20 in the upper portion of the arm 14, and for attaching the cap 28 to the stud. The thread 44 is preferably made so that it turns rather stiffly in the threaded opening 18. After the stud in inserted and screwed up tightly in the threaded opening 18, the cap 28 is screwed on and set against the top of the arm. The construction shown in Fig. 2 is somewhat simplified from that of Fig. 1 by the substitution of the single right-handed thread 44 for the two threads 24 and 26 of different hand and different diameter. The stud 20 in Fig. 1 will be positively locked in place in a much more secure manner than the stud 42 in Fig. 2, but for many purposes the construction shown in Fig. 2 will be found thoroughly satisfactory and greatly superior to anything known in the prior art.

In both forms of the leveling screw construction, a screw stud or stem is fixed concentrically in the inverted cylindrical chamber or bore, and the leveling operation is effected by rotating a sleeve having an internal thread which operates on a screw stud enclosed within the annular space surrounding the stud. The sliding joint between the sleeve and the wall of the cylindrical tubular chamber or hood is accurately formed so as to avoid the entry of dust and dirt and other materials which would affect the threaded connection between the stud and the sleeve. A fully enclosed threaded leveling screw is therefore provided by a unique construction arrangement.

From the foregoing description, it is apparent that modifications may be made without departing from the spirit and scope of the invention as defined by the appended claims.

What is claimed as new is:

1. In a leveling screw construction for surveying instruments and the like, a substantially horizontal leveling arm, the outer end of which has a substantially vertical bore therethrough, the upper portion of said bore being threaded and the remaining lower portion of the bore being cylindrical and of substantially larger diameter and extent than the threaded portion, a shouldered threaded screw stud extending through said bore with a shoulder engaging the upper portion of said cylindrical section of the bore and being provided with a thread engaging the thread in said arm, a portion of said stud extending above the arm and being provided with a different-handed thread from that of the arm, a locking cap threaded on the stud extension, a movable sleeve member threaded on said stud and extending into said cylindrical bore, said sleeve member having a cylindrical external surface substantially fitting the internal surface of said bore, a base plate below said arm, and means on the lower end of said sleeve engaging said plate.

2. In a leveling screw construction for surveying instruments and the like, a leveling arm, the outer end of which has a substantially vertical bore therethrough, the upper portion of said bore having a right-handed thread and the remaining lower portion of the bore being cylindrical, unthreaded and of substantially larger diameter and extent than the threaded portion, a threaded shouldered screw stud extending through said bore with a shoulder engaging the upper portion of said unthreaded cylindrical section of the bore and being provided with a thread engaging the thread in said arm, a rotatable sleeve member having a cylindrical external surface threaded on said stud and extending into said cylindrical bore, a base plate below said arm, and means on the lower end of said sleeve engaging said plate.

3. A leveling screw construction for surveying instruments and the like, comprising a substantially horizontal leveling arm, the outer end of which has a substantially vertical bore therethrough, the upper portion of said bore being threaded, and the remaining lower portion of the bore being cylindrical and of substantially larger diameter and extent than the threaded portion, a threaded screw stud extending through said bore and being provided with a thread engaging the thread in said arm, a portion of said threaded stud extending above the arm, a locking cap threaded on said stud extension, a rotatable sleeve member threaded on said stud and extending into the cylindrical portion of said bore, said sleeve member having a cylindrical external surface of only slightly smaller diameter than the internal diameter of said bore, a base plate below said arm, and means connected with the lower end of said sleeve for engaging said plate.

4. In a leveling screw construction for surveying instruments and the like including a laterally-extending leveling arm and a base plate below said arm, the improvement which comprises a leveling arm having a substantially vertical bore through its outer end, the lower and major portion of the bore being cylindrical and unthreaded, a threaded stud mounted axially in said bore and being secured in place in the upper portion thereof, said stud extending through the cylindrical lower portion of the bore in spaced relation to the wall thereof, a rotatable sleeve member threaded on the lower portion of said stud and extending into the cylindrical lower portion of said bore, said sleeve member having a cylindrical external surface of only slightly smaller diameter than that of the internal diameter of the cylindrical lower portion of said bore so that it forms a sliding joint with the wall thereof, and means connected with the lower end of said sleeve for engaging said base plate.

WILLIAM PATROSIO.
WILLIAM FERBER.

REFERENCES CITED

The following references are of record in the file of this patent:

UNITED STATES PATENTS

| Number | Name | Date |
|---|---|---|
| 1,779,080 | Arms | Oct. 21, 1930 |
| 2,208,014 | Brunson | July 16, 1940 |
| 2,127,302 | Langsner | Aug. 16, 1938 |
| 2,248,209 | Vacquier et al. | July 8, 1941 |